US009421854B2

(12) United States Patent
Okuda et al.

(10) Patent No.: US 9,421,854 B2
(45) Date of Patent: Aug. 23, 2016

(54) VEHICLE DRIVE DEVICE

(75) Inventors: Koichi Okuda, Okazaki (JP); Atsushi Tabata, Okazaki (JP); Tatsuya Imamura, Okazaki (JP); Keita Imai, Toyota (JP); Sho Mizushino, Chiryu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 236 days.

(21) Appl. No.: 14/373,220

(22) PCT Filed: Jan. 20, 2012

(86) PCT No.: PCT/JP2012/051233
§ 371 (c)(1),
(2), (4) Date: Jul. 18, 2014

(87) PCT Pub. No.: WO2013/108397
PCT Pub. Date: Jul. 25, 2013

(65) Prior Publication Data
US 2015/0239332 A1 Aug. 27, 2015

(51) Int. Cl.
*F01K 13/00* (2006.01)
*F01B 21/04* (2006.01)
(Continued)

(52) U.S. Cl.
CPC . *B60K 6/26* (2013.01); *B60K 6/36* (2013.01); *B60K 6/383* (2013.01); *B60K 6/40* (2013.01);
(Continued)

(58) Field of Classification Search
CPC .......... B60K 6/26; B60K 6/383; B60K 6/36; B60K 6/50; B60K 6/48; B60K 6/485; B60K 6/405; B60K 6/547; B60K 6/40; B60K 2001/006; B60K 2006/4825; F16H 41/02; F16H 45/00; F16H 41/00; F16H 45/02; Y10S 903/915; Y02T 10/6221; Y02T 10/6252; Y02T 10/6226
USPC .................................. 60/330, 341, 345, 716
See application file for complete search history.

(56) References Cited

U.S. PATENT DOCUMENTS 3,507,118 A * 4/1970 Hirozawa ............... F16H 61/58
60/345
2001/0020402 A1* 9/2001 Shichinohe ............. F16H 45/02
74/730.1

(Continued)

FOREIGN PATENT DOCUMENTS

JP 2000-190749 A 7/2000
JP 2002-103997 A 4/2002
(Continued)

Primary Examiner — Hoang Nguyen
(74) Attorney, Agent, or Firm — Kenyon & Kenyon LLP (57) ABSTRACT

A vehicle drive device includes: a torque converter having an input-side rotating member to which power from a prime mover is input and an output-side rotating member outputting power to drive wheels; an electric motor coupled to the input-side rotating member; a transmission coupled to the output-side rotating member of the torque converter; and a case member housing the torque converter, the electric motor, and the transmission, the case member having an air chamber and an oil chamber, the prime mover and the electric motor being disposed at positions with the torque converter interposed therebetween in an axial direction, the torque converter being housed in the air chamber, the electric motor being housed in the oil chamber the vehicle drive device further comprising a second electric motor coupled to the output-side rotating member of the torque converter, the second electric motor being disposed between the electric motor and the transmission in the axial direction in the oil chamber, an oil pressure generating device being disposed between the electric motor and the second electric motor in the axial direction in the oil chamber, and a drive gear of the oil pressure generating device being coupled to the input-side rotating member of the torque converter via a first shaft disposed in parallel with an axis on an inner circumferential side of the electric motor, a second shaft parallel to the axis being disposed on an inner circumferential side of the first shaft, a stator impeller of the torque converter being coupled via a one-way clutch and the second shaft to a cover member that is a non-rotating member of the oil pressure generating device, and the second shaft and the cover member being coupled, and an oil passage for supplying an operating oil to the torque converter being made up of a gap formed between an inner circumferential surface of the first shaft and an outer circumferential surface of the second shaft.

3 Claims, 6 Drawing Sheets

(51) Int. Cl.

| | | |
|---|---|---|
| *B60K 6/26* | (2007.10) | |
| *F16H 41/00* | (2006.01) | |
| *F16H 41/02* | (2006.01) | |
| *F16H 45/00* | (2006.01) | |
| *F16H 45/02* | (2006.01) | |
| *B60K 6/40* | (2007.10) | |
| *B60K 6/547* | (2007.10) | |
| *B60K 6/405* | (2007.10) | |
| *B60K 6/48* | (2007.10) | |
| *B60K 6/485* | (2007.10) | |
| *B60K 6/36* | (2007.10) | |
| *B60K 6/383* | (2007.10) | |
| *B60K 6/50* | (2007.10) | |
| *B60K 1/00* | (2006.01) | |

(52) U.S. Cl.
CPC ............... *B60K 6/405* (2013.01); *B60K 6/48* (2013.01); *B60K 6/485* (2013.01); *B60K 6/50* (2013.01); *B60K 6/547* (2013.01); *F16H 41/00* (2013.01); *F16H 41/02* (2013.01); *F16H 45/00* (2013.01); *F16H 45/02* (2013.01); *B60K 2001/006* (2013.01); *B60K 2006/4825* (2013.01); *Y02T 10/6221* (2013.01); *Y02T 10/6226* (2013.01); *Y02T 10/6252* (2013.01); *Y10S 903/915* (2013.01)

(56) References Cited

U.S. PATENT DOCUMENTS

| | | | |
|---|---|---|---|
| 2002/0036434 A1 | 3/2002 | Tsuzuki et al. | |
| 2002/0105225 A1* | 8/2002 | Endo | B60K 6/48 303/152 |
| 2003/0061809 A1* | 4/2003 | Okada | F16H 41/26 60/345 |
| 2006/0270519 A1 | 11/2006 | Kamada et al. | |
| 2011/0121692 A1 | 5/2011 | Iwase et al. | |
| 2011/0240430 A1 | 10/2011 | Iwase et al. | |
| 2011/0240431 A1 | 10/2011 | Iwase et al. | |
| 2012/0217830 A1 | 8/2012 | Iwase et al. | |
| 2012/0247106 A1* | 10/2012 | Noda | B60K 6/48 60/714 |
| 2012/0318630 A1 | 12/2012 | Iwase et al. | |
| 2012/0319514 A1 | 12/2012 | Iwase et al. | |
| 2012/0323425 A1 | 12/2012 | Suyama et al. | |
| 2013/0030624 A1 | 1/2013 | Suyama et al. | |

FOREIGN PATENT DOCUMENTS

| | | |
|---|---|---|
| JP | 2004-183807 A | 7/2004 |
| JP | 2004-328932 A | 11/2004 |
| JP | 2006-327509 A | 12/2006 |
| JP | 2010-120543 A | 6/2010 |
| JP | 2011-037296 A | 2/2011 |
| JP | 2011-183871 A | 9/2011 |
| JP | 2011-255889 A | 12/2011 |

* cited by examiner

|  | C1 | C2 | B1 | B2 | B3 |
|---|---|---|---|---|---|
| 1st | ◯ |  |  | ◯ |  |
| 2nd | ◯ |  | ◯ |  |  |
| 3rd | ◯ |  |  |  | ◯ |
| 4th | ◯ | ◯ |  |  |  |
| 5th |  | ◯ |  |  | ◯ |
| 6th |  | ◯ | ◯ |  |  |
| R |  |  |  | ◯ | ◯ |
| N |  |  |  |  |  |

◯ ENGAGED

VEHICLE DRIVE DEVICE

CROSS-REFERENCE TO RELATED APPLICATIONS

This is a national phase application based on the PCT International Patent Application No. PCT/JP2012/051233 filed Jan. 20, 2012, the entire contents of which are incorporated herein by reference.

TECHNICAL FIELD

The present invention relates to a configuration of a vehicle drive device including a hydraulic power transmission device having an input-side rotating member to which power from a prime mover is input and an output-side rotating member outputting power to drive wheels, an electric motor coupled to the input-side rotating member, and a transmission coupled to the output-side rotating member of the hydraulic power transmission device.

BACKGROUND ART

A vehicle drive device is known that includes a hydraulic power transmission device having an input-side rotating member to which power from a prime mover is input and an output-side rotating member outputting power to drive wheels, an electric motor coupled to the input-side rotating member, and a transmission coupled to the output-side rotating member of the hydraulic power transmission device. A hybrid vehicle drive device of Patent Document 1 is an example thereof. The hybrid vehicle drive device of Patent Document 1 has an engine, an electric motor, a torque converter, and a transmission disposed in this order from the engine toward the transmission in the axial direction.

PRIOR ART DOCUMENTS

Patent Documents

Patent Document 1: Japanese Laid-Open Patent Publication No. 2002-103997
Patent Document 2: Japanese Laid-Open Patent Publication No. 2004-183807
Patent Document 3: Japanese Laid-Open Patent Publication No. 2000-190749

SUMMARY OF THE INVENTION

Problem to be Solved by the Invention

The hybrid vehicle drive device of Patent Document 1 has the electric motor disposed between the engine and the torque converter in the axial direction, and the torque converter and the electric motor are housed in the same space. This configuration makes oil cooling of the electric motor difficult and cooling performance of the electric motor may be insufficient. In Patent Document 2, although the engine, the torque converter, the electric motor, and the transmission are disposed in this order from the engine toward the transmission in the axial direction, the electric motor and the torque converter are housed in the same space. Therefore, the oil cooling of the electric motor is difficult also in Patent Document 2 and the cooling performance of the electric motor may be insufficient.

The present invention was conceived in view of the situations and it is therefore an object of the present invention to provide a configuration of a vehicle drive device that includes a hydraulic power transmission device having an input-side rotating member to which power from a prime mover is input and an output-side rotating member outputting power to drive wheels, an electric motor coupled to the input-side rotating member, and a transmission coupled to the output-side rotating member of the hydraulic power transmission device and that can improve cooling performance of the electric motor.

Means for Solving the Problem

To achieve the object, the first aspect of the invention provides (a) a vehicle drive device comprising: a hydraulic power transmission device having an input-side rotating member to which power from a prime mover is input and an output-side rotating member outputting power to drive wheels; an electric motor coupled to the input-side rotating member; a transmission coupled to the output-side rotating member of the hydraulic power transmission device; and a case member housing the hydraulic power transmission device, the electric motor, and the transmission, the case member having an air chamber and an oil chamber, (b) the prime mover and the electric motor being disposed at positions with the hydraulic power transmission device interposed therebetween in an axial direction, (c) the hydraulic power transmission device being housed in the air chamber, the electric motor being housed in the oil chamber, (d) the vehicle drive device further comprising a second electric motor coupled to the output-side rotating member of the hydraulic power transmission device, wherein (e) the second electric motor is disposed between the electric motor and the transmission in the axial direction in the oil chamber.

Effects of the Invention

Consequently, even in a configuration with the prime mover and the electric motor coupled to the input-side rotating member of the hydraulic power transmission device, the prime mover and the electric motor are arranged at the positions with the hydraulic power transmission device interposed therebetween in the axial direction, the electric motor can be housed in the oil chamber. Since the electric motor is housed in the oil chamber, the electric motor can be oil-cooled and, therefore, the cooling performance of the electric motor can be improved. Since the second electric motor is housed in the oil chamber housing the transmission as is the case with the electric motor, the second electric motor can also be oil-cooled and the cooling performance of the second electric motor can also be improved.

Preferably, the second aspect of the invention provides the vehicle drive device recited in the first aspect of the invention further comprising a second electric motor coupled to the output-side rotating member of the hydraulic power transmission device, wherein the second electric motor is disposed between the electric motor and the transmission in the axial direction in the oil chamber. Consequently, since the second electric motor is housed in the oil chamber housing the transmission as is the case with the electric motor, the second electric motor can also be oil-cooled and the cooling performance of the second electric motor can also be improved.

Preferably, the second aspect of the invention provides the vehicle drive device recited in the first aspect of the invention, wherein an oil pressure generating device is disposed between the electric motor and the second electric motor in the axial direction in the oil chamber, and wherein a drive gear of the oil pressure generating device is coupled to the input-side rotating member of the hydraulic power transmission device via a first shaft disposed in parallel with an axis on an inner circumferential side of the electric motor. Consequently, when the input-side rotating member of hydraulic power transmission device rotates, the drive gear is rotated and the oil pressure generating device is operated. Since the oil pressure generating device is disposed between the electric motor and the second electric motor, heat transfer between the electric motor and the second electric motor is suppressed and thermal performance is improved.

Preferably, the third aspect of the invention provides the vehicle drive device recited in the second aspect of the invention, wherein a second shaft parallel to the axis is disposed on an inner circumferential side of the first shaft, wherein the hydraulic power transmission device is a torque converter, wherein a stator impeller of the torque converter is coupled via a one-way clutch and the second shaft to a cover member that is a non-rotating member of the oil pressure generating device, and wherein the second shaft and the cover member are coupled. Consequently, an oil passage for supplying operating oil to the hydraulic power transmission device can be formed between the inner circumferential surface of the first shaft and the outer circumferential surface of the second shaft. Since the oil passage is made up of the members different from the rotation shaft of the electric motor, the heat transfer between the oil passage and the electric motor is suppressed.

Preferably, the fourth aspect of the invention provides the vehicle drive device recited in the second or third aspect of the invention, wherein terminal blocks of the electric motor and the second electric motor are disposed on an outer circumferential side of the oil pressure generating device. Consequently, since a space is formed on the outer circumferential side of the oil pressure generating device, the terminal blocks of the electric motor and the second electric motor can be disposed in the space with shifted phases so as to effectively utilize the space.

Preferably, the fifth aspect of the invention provides the vehicle drive device recited in the first aspect of the invention, wherein a partition wall is formed between the hydraulic power transmission device and the electric motor with a seal member disposed on an inner circumferential portion of the partition wall, and wherein the seal member seals the oil chamber. Consequently, the intrusion of foreign material into the oil chamber is prevented. This seal member can also be used as the seal between the hydraulic power transmission device and the transmission and an increase in the number of parts can be suppressed. Since the air chamber and the oil chamber can be partitioned by the partition wall, heat transfer between the hydraulic power transmission device and the electric motor is suppressed.

Preferably, in the third aspect of the invention, the second shaft and the cover member are connected by press-fitting. As a result, the press-fitting portion between the second shaft and the cover member also acts as a seal structure and eliminates the need for a seal member.

MODE FOR CARRYING OUT THE INVENTION

An embodiment of the present invention will now be described in detail with reference to the drawings. In the following embodiment, the figures are simplified or deformed as needed and portions are not necessarily precisely depicted in terms of dimension ratio, shape, etc.

EXAMPLE

Figure 1:
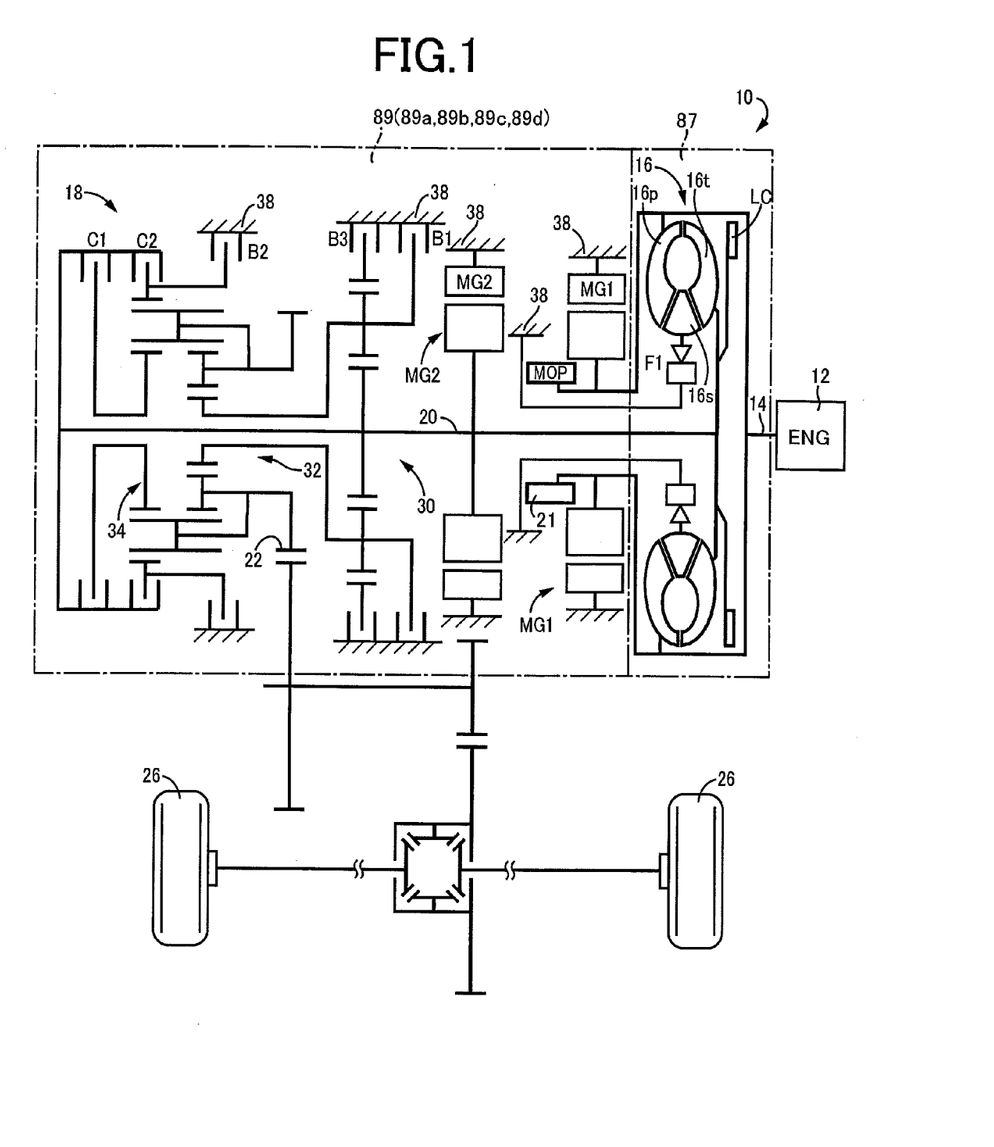
FIG. 1 is a schematic for explaining a configuration of a vehicle drive device that is an example of the present invention.

FIG. 1 is a schematic for explaining a configuration of a vehicle drive device 10 that is an example of the present invention. In FIG. 1, the vehicle drive device 10 is preferably employed in FF (front-engine front-drive) type vehicles and includes an engine 12 acting as a prime mover, a torque converter 16 coupled to a crankshaft 14 of the engine 12, an automatic transmission 18 disposed between the torque converter 16 and drive wheels 26 and coupled to an output-side of the torque converter 16 (corresponding to a hydraulic power transmission device of the present invention), a first electric motor MG1 disposed between the torque converter 16 and the automatic transmission 18 and coupled to a pump impeller 16p that is an input-side rotating member of the torque converter 16, and a second electric motor MG2 disposed between the first electric motor MG1 and the automatic transmission 18 and coupled to a turbine impeller 16t that is an output-side rotating member of the torque converter 16 and an input shaft 20 of the automatic transmission 18. An oil pump 21 is disposed that is an oil pressure generating device disposed between the first electric motor MG1 and the second electric motor MG2 and coupled to the pump impeller 16p of the torque converter 16, the engine 12, and the first electric motor MG1. As depicted in FIG. 1, the vehicle drive device 10 of this example has the engine 12, the torque converter 16, the first electric motor MG1, the oil pump 21, the second electric motor MG2, and the automatic transmission 18 disposed in this order from the engine 12 toward the automatic transmission 18 in the axial direction. Therefore, the engine 12 and the first electric motor MG1 are disposed at positions with the torque converter 16 interposed therebetween in their axial direction. The first electric motor MG1 corresponds to an electric motor of the present invention; the second electric motor MG2 corresponds to a second electric motor of the present invention; the automatic transmission 18 corresponds to a transmission of the present invention; and the oil pump 21 corresponds to an oil pressure generating device of the present invention.

The torque converter 16 is a hydraulic power transmission device including the pump impeller 16p that is an input-side rotating member to which power from the engine 12 is input, the turbine impeller 16t that is an output-side rotating member outputting power to the drive wheels 26, a stator impeller 16s, and a one-way clutch F1. The pump impeller 16p, i.e., a pump impeller, is coupled to the crankshaft 14 of the engine 12 and the first electric motor MG1 and is rotationally driven by the engine 12 to generate a fluid flow due to a flow of operating oil in the torque converter 16. The turbine impeller 16*t*, i.e., a turbine runner, is coupled to the input shaft 20 of the automatic transmission 18 and is rotated in response to the fluid flow from the pump impeller 16*p*. The stator impeller 16*s* is disposed in the fluid flow from the pump impeller 16*p* to the turbine impeller 16*t* and is supported by the one-way clutch F1 rotatably in the positive rotation direction of the crankshaft 14 (the rotation direction of the crankshaft 14 during operation of the engine 12) and non-rotatably in the negative rotation direction. The input shaft 20 of the automatic transmission 18 also acts as an output shaft, i.e., a turbine shaft, of the torque converter 16.

The torque converter 16 includes a lockup clutch LC selectively coupling the pump impeller 16*p* and the turbine impeller 16*t*. The lockup clutch LC is operated through operating oil from a hydraulic control circuit 90 (see FIG. 3) and is controlled to one of an engaged state, a slipping state, and a released state. When the lockup clutch LC is in the released state, torque is transmitted between the crankshaft 14 and the input shaft 20 via the operating oil in the torque converter 16 as described above. When the lockup clutch LC is in the engaged state, the lockup clutch LC mechanically directly couples the pump impeller 16*p* and the turbine impeller 16*t* and, therefore, the crankshaft 14 of the engine 12 and the input shaft 20 of the automatic transmission 18 are integrally coupled to each other and torque is directly transmitted between the crankshaft 14 and the input shaft 20 without intervention of the operating oil in the torque converter 16.

The first electric motor MG1 is coupled to the crankshaft 14 of the engine 12 in series via a damper etc., absorbing pulsation, for example, and is coupled to the pump impeller 16*p* of the torque converter 16 via a first shaft 52 described later. In short, the first electric motor MG1 is coupled to a power transmission path between the engine 12 and the torque converter 16. The second electric motor MG2 is coupled to a power transmission path between the torque converter 16 and the drive wheels 26 and is specifically coupled to the pump impeller 16*p* of the torque converter 16 and the input shaft 20 of the automatic transmission 18. The first electric motor MG1 and the second electric motor MG2 are rotating machines configured to selectively acquire a function of an electric motor generating a drive torque and a function of an electric generator generating a regenerative torque and are made up of AC synchronous motor generators, for example.

Figure 2:
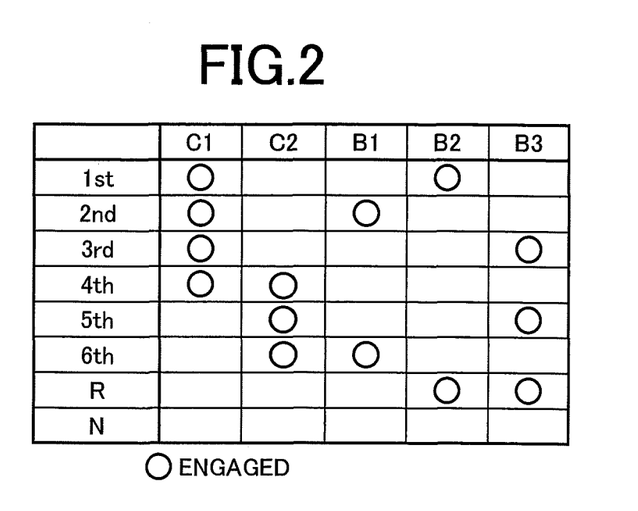
FIG. 2 is an operation table of hydraulic friction engagement devices for establishing shift stages in an automatic transmission depicted in FIG. 1.

The automatic transmission 18 is interposed between the torque converter 16 and the drive wheels 26 and is a mechanical transmission making up a portion of a power transmission path between the second electric motor MG2 and the drive wheels 26. Specifically, the automatic transmission 18 is a known planetary gear type multistage transmission including a first planetary gear device 30, a second planetary gear device 32, a third planetary gear device 34, and a plurality of hydraulic friction engagement devices C1, C2, B1, B2, and B3, in a transmission case 38 (hereinafter, a case 38) that is a non-rotating member. The automatic transmission 18 outputs power of the engine 12 input to the input shaft 20 acting as an input rotating member, from an output gear 22 acting as an output rotating member toward the drive wheels 26. In the automatic transmission 18, the known hydraulic friction engagement devices (clutches C1, C2, brakes B1, B2, B3) are respectively engaged or released by the operating oil from the hydraulic control circuit 90 (see FIG. 3) in accordance with a predetermined operation table depicted in FIG. 2 to alternatively establish a plurality of shift stages (gear stages) having respective different gear ratios γat (=transmission input rotation speed Natin/rotation speed Nout of the output shaft 22) of the automatic transmission 18. In FIG. 2, "◯" indicates an engaged state and a blank indicates a released state.

Figure 3:
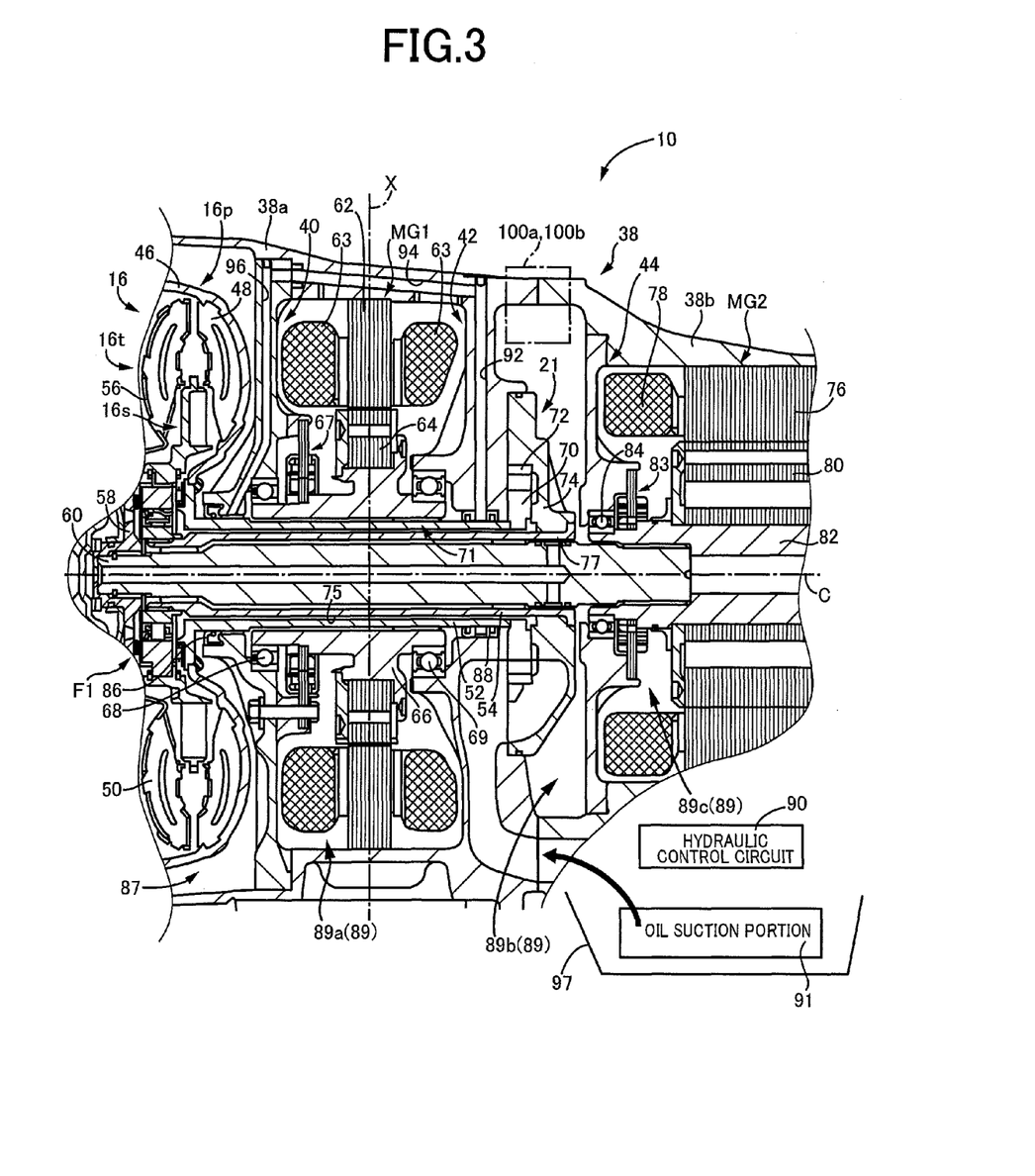
FIG. 3 is a cross-sectional view for explaining a portion of the configuration of the vehicle drive device of FIG. 1 and specifically corresponds to a cross-sectional view of parts indicated by a dashed-dotted line of FIG. 1.
Figure 4:
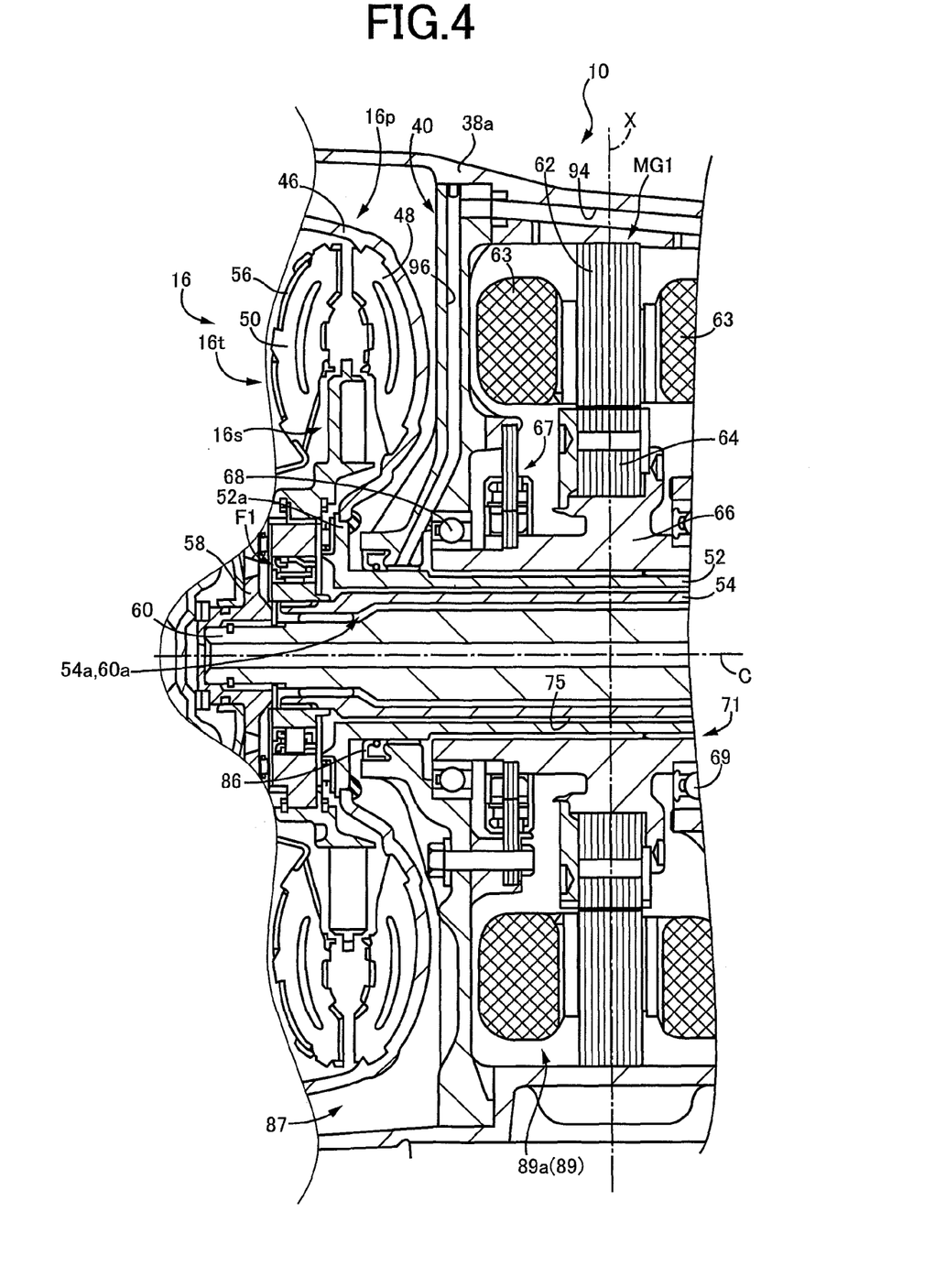
FIG. 4 is an enlarged cross-sectional view of a torque converter side of FIG. 3 (on the left side of FIG. 3).
Figure 5:
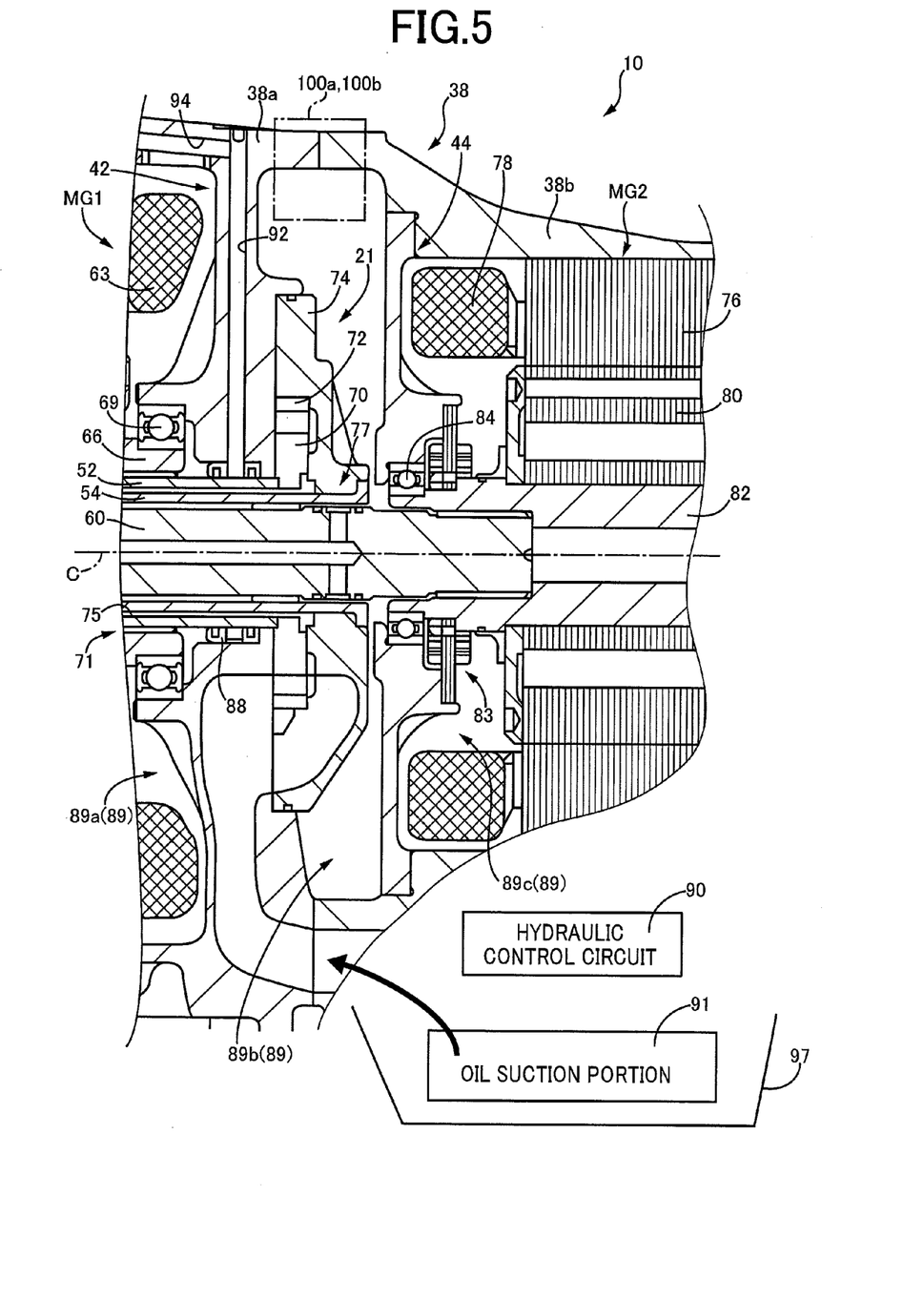
FIG. 5 is an enlarged cross-sectional view of a second electric motor side of FIG. 3 (on the right side of FIG. 3).

FIG. 3 is a cross-sectional view for explaining a portion of the configuration of the vehicle drive device 10 of FIG. 1 and specifically corresponds to a cross-sectional view around the torque converter 16, the first electric motor MG1, the oil pump 21, and the second electric motor MG2. FIG. 4 is an enlarged cross-sectional view of the torque converter 16 side of FIG. 3 (closer to the engine 12 on the left side of FIG. 3) and FIG. 5 is an enlarged cross-sectional view of the second electric motor MG2 side of FIG. 3 (closer to the automatic transmission 18 on the right side of FIG. 3). As depicted in FIG. 3, the vehicle drive device 10 has the torque converter 16, the first electric motor MG1, the oil pump 21, and the second electric motor MG2 disposed in series from the torque converter 16 toward the second electric motor MG2 in the axial direction in the case 38 that is a non-rotating member. In FIG. 3, the engine 12 is disposed on the left of the torque converter 16 and the automatic transmission 18 is disposed on the right of the second electric motor MG2. Therefore, the engine 12 and the first electric motor MG1 are disposed at the positions with the torque converter 16 interposed therebetween in the axial direction.

The case 38 corresponding to a case member of the present invention is made up of a plurality of members (38*a*, 38*b*), houses the torque converter 16, the first electric motor MG1, and the automatic transmission 18, and has an air chamber made up of a space 87 described later and an oil chamber made up of a space 89 (89*a* to 89*d*) described later. The case 38 further includes a first partition wall 40 inserted between the torque converter 16 and the first electric motor MG1, a second partition wall 42 inserted between the first electric motor MG1 and the oil pump 21, and a third partition wall 44 inserted between the oil pump 21 and the second electric motor MG2.

The torque converter 16 is housed in the space 87 acting as the air chamber and mainly includes the pump impeller 16*p*, the turbine impeller 16*t*, and the stator impeller 16*s*. The pump impeller 16*p* includes a front case (not depicted in FIG. 3) and a rear case 46 coupled to the crankshaft 14 that is an output shaft of the engine 12 and integrally rotating with the crankshaft 14, as well as a plurality of circumferentially arranged blades 48 and, when the engine 12 rotates, the blades 48 are rotated integrally with the rear case 46. Because of the rotation of the blades 48 of the pump impeller 16*p*, the operating oil filled in the pump impeller 16*p* is driven by the blades 48 toward an outer circumference. The operating oil collides with blades 50 of the turbine impeller 16*t* disposed facing the pump impeller 16*p*, rotates the blades 50 of the turbine impeller 16*t* by impact force thereof, then flows along curves of the blades 50 of the turbine impeller 16*t*, and returns through the stator impeller 16*s* to the pump impeller 16*p*, thereby circulating within the torque converter 16.

An inner circumferential end portion of the rear case 46 is coupled by welding to the first shaft 52 disposed in parallel with an axis C and rotatably around the axis C. The first shaft 52 is formed into a cylindrical tubular shape and is supported rotatably around the axis C by the first partition wall 40 and the second partition wall 42 of the case 38. A radially projecting flange portion 52*a* (see FIG. 4) is formed at one end of the first shaft 52 on the torque converter side 16 in the axial direction, and the inner circumferential end portion of the rear case 46 is coupled by welding to an outer circumferential end portion of the flange portion 52a. The first shaft 52 axially penetrates an inner circumferential side of the first electric motor MG1 and is coupled at an end portion on the second electric motor MG2 side in the axial direction to a drive gear 70 described later that is a drive gear of the oil pump 21.

If a relative rotation speed difference between the pump impeller 16p and the turbine impeller 16t is relatively large such as in a state when the pump impeller 16p starts rotating, a flow of the operating oil flowing out from the turbine impeller 16t flows in the direction of blocking the rotation of the pump impeller 16p; however, since the stator impeller 16s is disposed between the pump impeller 16p and the turbine impeller 16t via the one-way clutch F1 spline-fitted to a cylindrical tubular second shaft 54 that is a non-rotating member, the flow of the operating oil is converted by the stator impeller 16s into the direction of assisting the flow of the pump impeller 16p. On the other hand, when the number of rotations of the turbine impeller 16t increases and the relative rotation speed difference between the pump impeller 16p and the turbine impeller 16t decreases, the stator impeller 16s then acts to block the flow; however, since the stator impeller 16s is rotated by the one-way clutch F1, such blocking of the flow is prevented. The second shaft 54 has an outer circumferential end portion on the torque converter 16 side in the axial direction spline-fitted to an inner ring of the one-way clutch F1. The second shaft 54 is disposed in parallel with the axis C to penetrate an inner circumference side of the first shaft 52 in the axial direction thereof and is extended to the oil pump 21 side. The second shaft 54 has an outer circumferential end portion on the second electric motor MG2 side in the axial direction press-fitted into an inner circumferential portion of a pump cover 74 described later that is a non-rotating member making up the oil pump 21. Therefore, the stator impeller 16s is coupled to the pump cover 74 of the oil pump 21 via the one-way clutch F1 and the second shaft 54, and the second shaft 54 coupled to the pump cover 74 and the inner ring of the one-way clutch F1 coupled to the second shaft 54 are non-rotatably retained. The second shaft 54 is press-fitted into the pump cover 74 and therefore non-rotatably supported via the pump cover 74 by the case 38 (the second partition wall 42).

The turbine impeller 16t includes a turbine shell 56 integrally rotating with the blades and an inner circumferential end thereof is coupled to a turbine hub 58 rotatable around the axis C. An inner circumferential portion of the turbine hub 58 is spline-fitted to an outer circumferential portion of a third shaft 60 disposed rotatably around the axis C on an inner circumferential side of the second shaft 54. The third shaft 60 is formed into a column shape and is disposed to axially penetrate the second shaft 54. The third shaft 60 has an outer circumferential end portion on the torque converter 16 side in the axial direction spline-fitted to the inner circumferential portion of the turbine hub 58. The third shaft 60 has an end portion on the second electric motor MG2 side in the axial direction spline-fitted to a rotor shaft 82 described later of the second electric motor MG2. The third shaft 60 has a taper-shaped smaller diameter portion 60a (see FIG. 4) to form the outer diameter on the torque converter 16 side in the axial direction smaller as compared to the second electric motor MG2 side, and the inner diameter of the second shaft 54 is also provided with a smaller diameter portion 54a (see FIG. 4) formed to have a smaller diameter (a tapered shape) in accordance with the outer diameter of the third shaft 60 such that a gap from the third shaft 60 is not substantially changed.

The first electric motor MG1 is housed in the space 89a acting as an oil chamber, is disposed between the torque converter 16 and the oil pump 21 in the axial direction, and is supported rotatably around the axis C. The first electric motor MG1 mainly includes a stator 62 non-rotatably fixed to the case 38, a coil end 63 disposed on both axial ends of the stator 62, a rotor core 64 rotatably disposed on an inner circumferential side of the stator 62, and a rotor shaft 66 connected to an inner circumferential portion of the rotor core 64. A resolver 67 for detecting the rotation speed of the first electric motor MG1 is disposed on an inner circumferential side of the coil end 63.

The stator 62 is non-rotatably fixed by a bolt etc. not depicted to the case 38. The rotor core 64 has the inner circumferential portion thereof connected to the rotor shaft 66 and is configured to rotate around the axis C integrally with the rotor shaft 66. The rotor shaft 66 has both outer circumferential ends rotatably supported via bearings 68, 69 by the case 38. An inner circumferential portion of the rotor shaft 66 is spline-fitted to outer teeth (spline teeth) formed on an outer circumferential portion of the first shaft 52 and the rotor shaft 66 is coupled via the first shaft 52 to, and rotates integrally with, the pump impeller 16p of the torque converter 16 and the engine 12. A spline fitting portion 71 between the rotor shaft 66 and the first shaft 52 is formed on the second electric motor MG2 side of the rotor core 64 in the axial direction. Specifically, the spline fitting portion 71 is formed closer to the second electric motor MG2 (closer to the automatic transmission 18 on the right side of the figures) relative to the center line of the first electric motor MG1 (the rotor core 64) in the axial direction indicated by a dashed-dotted line X. Therefore, a distance is made longer in the axial direction between a shaft end portion of the first shaft 52 on the torque converter 16 side and the spline fitting portion 71.

The oil pump 21 acting as the oil pressure generating device is a known gear pump that is disposed between the first electric motor MG1 and the second electric motor MG2 in the axial direction in the space 89b acting as an oil chamber and that mainly includes the drive gear 70, a driven gear 72 meshed with the drive gear 70, and the pump cover 74 (cover member) housing the drive gear 70 and the driven gear 72. The drive gear 70 is coupled to the pump impeller 16p of the torque converter 16 via the first shaft 52 disposed on the inner circumferential side of the first electric motor MG1. The pump cover 74 is fixed by a bolt etc. not depicted to the second partition wall 42 and is non-rotatably fixed. When the pump impeller 16p of the torque converter 16 rotates, the oil pump 21 is operated through driving of the drive gear 70 via the first shaft 52. Since the inner circumferential portion of the pump cover 74 making up the oil pump 21 is connected to the second shaft 54 by press-fitting, oil is prevented from leaking therethrough. Therefore, a press-fitting portion 77 between the pump cover 74 and the second shaft 54 acts as a seal structure preventing the leakage of oil from the oil pump 21.

An oil passage 75 for supplying the operating oil to the torque converter 16 is formed between an inner circumferential surface of the first shaft 52 and an outer circumferential surface of the second shaft 54. The first shaft 52 is disposed on an inner circumferential side of the rotor shaft 66 of the first electric motor MG1 to couple the pump impeller 16p (the rear case 46) of the torque converter 16 and the drive gear 70 of the oil pump 21. The second shaft 54 is disposed on an inner circumferential side of the first shaft 52 to couple the inner ring of the one-way clutch F1 of the torque converter 16 and the pump cover 74. The oil passage 75 for supplying the operating oil to the torque converter 16 is made up of a gap formed between the inner circumferential surface of the first shaft 52 and the outer circumferential surface of the second shaft 54. The oil passage 75 is supplied with the operating oil pumped up by the oil pump 21 after pressure adjustment by the hydraulic control circuit 90.

The second electric motor MG2 is disposed between the first electric motor MG1/the oil pump 21 and the automatic transmission 18 in the axial direction in the space 89c acting as an oil chamber and is supported rotatably around the axis C. The second electric motor MG2 mainly includes a stator 76 non-rotatably fixed to the case 38, a coil end 78 disposed on both axial ends of the stator 76, a rotor core 80 rotatably disposed on an inner circumferential side of the stator 76, and the rotor shaft 82 connected to an inner circumferential portion of the rotor core 80. A resolver 83 for detecting the rotation speed is disposed on an inner circumferential side of the coil end 78 of the second electric motor MG2.

The stator 76 is non-rotatably fixed by a bolt etc. not depicted to the case 38. The rotor core 80 has the inner circumferential portion thereof connected to the rotor shaft 82 and is configured to rotate around the axis C integrally with the rotor shaft 82. The rotor shaft 82 has both outer circumferential ends rotatably supported via a bearing 84 etc. by the case 38. An inner circumferential portion of the rotor shaft 82 is spline-fitted to the third shaft 60 and the rotor shaft 82 rotates integrally with the third shaft 60 and the input shaft 20 of the automatic transmission 18. The third shaft 60 is rotatably supported by the case 38 (second partition wall 42) via a bush as well as the second shaft 54 and the pump cover 74.

Although not depicted in FIGS. 3 to 5, the automatic transmission 18 is housed in the space 89d acting as an oil chamber (see FIG. 1).

The first partition wall 40 is formed between the torque converter 16 and the first electric motor MG1 in the axial direction so as to partition a space housing the torque converter 16 and the first electric motor MG1. A first oil seal 86 is disposed between an inner circumferential end portion of the first partition wall 40 and the first shaft 52 so that the space 87 housing the torque converter 16 is spatially separated from the space 89a housing the first electric motor MG1. The space 87 housing the torque converter 16 is an air chamber air-cooled by air from the outside. Therefore, the torque converter 16 housed in the space 87 acting as the air chamber is air-cooled by air from the outside.

Although the first oil seal 86 acts as a member for sealing between the space 87 housing the torque converter 16 and the space 89a housing the first electric motor MG1, the first oil seal 86 not only separates the space 87 from the space 89a but also acts as a member spatially separating (sealing) the space 87 housing the torque converter 16 from the space 89b housing the oil pump 21, the space 89c housing the second electric motor MG2, and the space 89d housing the automatic transmission 18. Therefore, in the vehicle drive device 10, the space 87 housing the torque converter 16 is separated and sealed by the first partition wall 40 and the first oil seal 86 from the spaces 89a to 89d housing the first electric motor MG1, the oil pump 21, the second electric motor MG2, and the automatic transmission 18. The spaces 89a to 89d are disposed with a lubrication circuit for cooling the devices. Since each of the spaces 89a to 89d is a space acting as an oil chamber, the spaces 89a to 89d can also be considered as the space 89 acting as an oil chamber housing the first electric motor MG1, the oil pump 21, the second electric motor MG2, and the automatic transmission 18. As a result, the first electric motor MG1 and the second electric motor MG2 are housed in the space 89 housing the automatic transmission 18. The first partition wall 40 corresponds to a partition wall of the present invention; the first oil seal 86 corresponds to a seal member of the present invention; the space 87 corresponds to an air chamber of the present invention; and the space 89 corresponds to an oil chamber of the present invention.

The second partition wall 42 is formed between the first electric motor MG1 and the oil pump 21 in the axial direction so as to partition a space housing the first electric motor MG1 and the oil pump 21. A second oil seal 88 is disposed between an inner circumferential end portion of the second partition wall 42 and the first shaft 52. Since the second oil seal 88 is disposed, oil is prevented from flowing between the space 89a housing the first electric motor MG1 and the oil pump 21. Specifically, the second oil seal 88 prevents movement of the oil leaking from a part of slidable connection between the inner circumferential end portion of the second partition wall 42 and the first shaft 52. Therefore, the second oil seal 88 has a seal function preventing leakage of the oil from the oil pump 21. A first radial oil passage 92 extending vertically upward for supplying cooling oil to the first electric motor MG1 is formed in the second partition wall 42 and the second oil seal 88 also has a function of preventing leakage of the oil flowing in the first radial oil passage 92. Therefore, the leakage of the oil from the oil pump 21 and the first radial oil passage 92 is prevented by the common second oil seal 88.

The first radial oil passage 92 is supplied with the oil having a pressure adjusted by the hydraulic control circuit 90 and is connected to an axial oil passage 94 formed vertically above the first electric motor MG1. The axial oil passage 94 has a plurality of oil release holes formed for supplying oil to the coil end 63 of the first electric motor MG1. The axial oil passage 94 is connected to a second radial oil passage 96 formed in the radial direction in the first partition wall 40. The second radial oil passage 96 is formed in the first partition wall 40 so as to communicate the axial oil passage 94 with the inner circumferential end portion of the first partition wall 40.

As descried above, lubrication oil passages for cooling the first electric motor MG1 are formed in the case 38. Specifically, when oil is supplied from the hydraulic control circuit 90 to the first radial oil passage 92, the oil is pumped vertically upward through the first radial oil passage 92, flowing into the axial oil passage 94. A portion of the oil flowing through the axial oil passage 94 is supplied through the release holes mainly to the coil end 63 of the first electric motor MG1. The remainder of the oil flowing through the axial oil passage 94 passes through the second radial oil passage 96 to be accumulated in an oil pan 97 disposed in a lower portion of the case 38 and is sucked up again from an oil suction portion 91 (strainer) disposed on the oil pan 97, thereby circulating within the space 89 acting as the oil chamber. The hydraulic control circuit 90 and the oil suction portion 91 are located closer to the second electric motor MG2 (on the right side of the figures) relative to the first electric motor MG1 in the axial direction. The hydraulic control circuit 90 adjusts oil pressure discharged from the oil pump 21 as needed to supply oil pressure optimum for the torque converter 16, the automatic transmission 18, the lubrication oil passages (92, 94, 96), etc.

Figure 6:
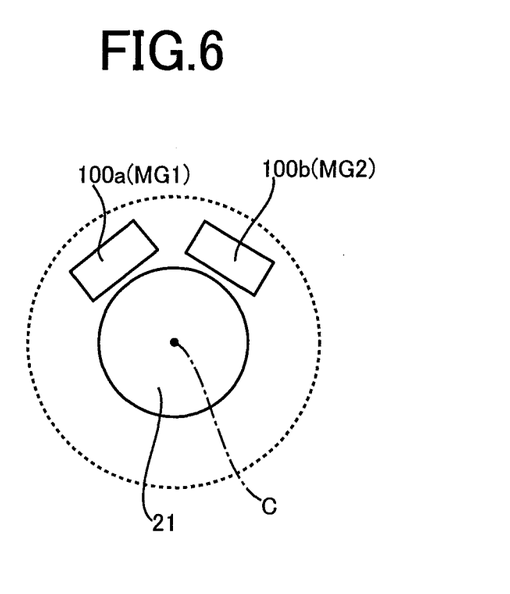
FIG. 6 depicts circumferential positions of terminal blocks of a first electric motor and a second electric motor indicated by a dashed-dotted line of FIG. 5 in a simplified manner.

A space is formed on an outer circumferential side of the oil pump 21. In this example, this space is utilized to dispose a terminal block 100*a* for electrically connecting the first electric motor MG1 from the outside of the case and a terminal block 100*b* for electrically connecting the second electric motor MG2 from the outside of the case (corresponding to parts surrounded by a dashed-dotted line of FIGS. 3 and 5). FIG. 6 depicts circumferential positions of the terminal block 100*a* and the terminal block 100*b* in a simplified manner. A broken line of FIG. 6 indicates an outer diameter line of the first electric motor MG1. As depicted in FIG. 6, the terminal block 100*a* and the terminal block 100*b* can be located at the same radial positions by locating the blocks at circumferentially shifted positions (phases) on the outer circumferential side of the oil pump 21.

Effects of the vehicle drive device 10 configured as described above will hereinafter be descried. As described above, the first electric motor MG1 and the second electric motor MG2 are housed in the space 89 acting as the oil chamber housing the automatic transmission 18 etc. As a result, the space 87 acting as an air chamber and housing the torque converter 16 and the space 89 housing the first electric motor MG1, the second electric motor MG2, and the automatic transmission 18 can be spatially separated and sealed, and an oil cooling mechanism of the first electric motor MG1 can easily be configured without intrusion of foreign material (dust or water) into the space 89 from the outside. Conventionally, since the first electric motor MG1 is disposed between the engine and the torque converter and the first electric motor MG1 is housed in the same space (air chamber) as the torque converter, this makes oil cooling of the first electric motor MG1 difficult and, therefore, cooling performance of the electric motor MG1 is insufficient.

The vehicle drive device 10 has the torque converter 16, the first electric motor MG1, and the second electric motor MG2 arranged in this order from the engine 12 toward the automatic transmission 18. This arrangement enables spatial separation of the torque converter 16 from the first electric motor MG1, the second electric motor MG2, and the automatic transmission 18.

Since the first oil seal 86 disposed between the torque converter 16 and the first electric motor MG1 acts as a seal mechanism not only for sealing of the first electric motor MG1 but also for sealing between the torque converter 16 and the second electric motor MG2/the automatic transmission 18, which is essentially required, and therefore, an increase of parts can be suppressed to reduce the vehicle drive device 10 in size.

The spline fitting portion 71 acting as a coupling portion between the torque converter 16 and the first electric motor MG1 is within the space 89 housing the automatic transmission 18 etc., and is disposed closer to the second electric motor MG2 relative to the center line of the first electric motor MG1 (the rotor core 64) in the axial direction indicated by the dashed-dotted line X of FIG. 3. As a result, since the spline fitting portion 71 is disposed within the space 89, the intrusion of foreign material into the spline fitting portion 71 is suppressed and lubrication using oil can be achieved to improve wear resistance of the spline fitting portion 71. When the spline fitting portion 71 is disposed closer to the second electric motor MG2 relative to the center line of the first electric motor MG1 (the rotor core 64) in the axial direction indicated by the dashed-dotted line X of FIG. 3, since a distance is made longer in the axial direction between a shaft end portion of the first shaft 52 on the torque converter 16 side and the spline fitting portion 71, coupling rigidity between the engine 12 and the first electric motor MG1 is made lower and an effect of vibration of the engine 12 is reduced. In other words, when a length of the second shaft 54 coupling the torque converter 16 and the spline fitting portion 71 is made longer in the axial direction, since rigidity of the second shaft 54 is made lower and a resonance frequency is changed, an effect of torque variation of the engine 12 is reduced.

Since the second radial oil passage 96 is formed in the first partition wall 40 inserted between the torque converter 16 and the first electric motor MG1, the first partition wall 40 is cooled, which improves a heat insulating effect between the torque converter 16 and the first electric motor MG1.

The pump impeller 16*p* of the torque converter 16 and the drive gear 70 of the oil pump 21 are coupled by the first shaft 52; the inner ring of the one-way clutch F1 of the torque converter 16 and the pump cover 74 of the oil pump 21 are connected by the second shaft 54 disposed on the inner circumferential side of the first shaft 52; and the second shaft 54 and the pump cover 74 are connected by press-fitting. As a result, the oil passage 75 for supplying the operating oil to the torque converter 16 is formed between the inner circumferential surface of the first shaft 52 and the outer circumferential surface of the second shaft 54 and the formation of this oil passage 75 suppresses an increase in the number of parts such as a seal member. Since the oil passage 75 is formed of members different from the rotor shaft 66 making up the first electric motor MG1, heat transfer from the oil passage 75 to the first electric motor MG1 is suppressed. Since the second shaft 54 and the pump cover 74 are connected by press-fitting, no seal member is required for preventing leakage of oil from the press-fitting portion 77.

The oil suction portion 91 sucks up the oil accumulated in the oil pan 97 formed in the lower portion of the case 38 by the hydraulic control circuit 90 controlling the oil pressure of the torque converter 16 etc. and the oil pump 21, and is disposed closer to the second electric motor MG2 than the first electric motor MG1 in the axial direction. As a result, a length of the oil passage from the hydraulic control circuit 90 and the oil suction portion 91 to the oil pump 21 is shortened, which enables reduction in pipeline resistance and reduction in noise due to a flow. Since the first electric motor MG1 can be made large in the radial direction, the first electric motor MG1 can be shortened in the axial direction.

The second oil seal 88 is disposed between the first electric motor MG1 and the oil pump 21. Since the second oil seal acts as a seal member of the oil pump 21 and also acts as a seal member preventing the leakage from the first radial oil passage 92, common use of the seal member suppresses an increase in the number of parts.

The first electric motor MG1 and the oil pump 21 are disposed in the same case 38*a* and the first electric motor MG1 is supported by the case 38*a*. The oil pump 21 is fixed to the second partition wall 42 that is a portion of the case 38*a*. As a result, the first electric motor MG1 and the oil pump 21 can be formed as sub-assemblies to improve assemblability of the vehicle drive device 10.

The turbine impeller 16*t* of the torque converter 16 and the second electric motor MG2 are connected via the third shaft 60 and the respective connecting portion is coupled by spline fitting to each other. As a result, since the second electric motor MG2 is supported via the bearing 84 etc., and is coupled to the torque converter 16 via a spline, shaft misalignment with the torque converter 16 is absorbed by the spline and transmission of vibration is also reduced by the spline fitting.

The smaller diameter portion 54*a* is formed such that the inner diameter of the second shaft 54 is made smaller than that on the second electric motor MG2 side in the axial direction while the small diameter portion 60a is also formed in the third shaft 60 such that the outer diameter is made smaller than that on the second electric motor MG2 side in the axial direction, and the third shaft 60 is supported by the case 38a. As a result, the smaller diameter portions 54a and 60a prevent the third shaft 60 from falling toward the torque converter 16 at the time of assembly.

As depicted in FIG. 6, the terminal block 100a of the first electric motor MG1 and the terminal block 100b of the second electric motor MG2 can be disposed on the outer circumferential side of the oil pump 21 at circumferentially shifted positions to effectively utilize the space of the oil pump 21. Since the terminal block 100a and the terminal block 100b can be gathered, workability at the time of assembly can be improved.

As described above, according to this example, even in a configuration with the engine 12 and the first electric motor MG1 coupled to the pump impeller 16p of the torque converter 16, the engine 12 and the first electric motor MG1 are arranged at the positions with the torque converter 16 interposed therebetween in the axial direction, the first electric motor MG1 can be housed in the space 89 that is an oil chamber. Since the first electric motor MG1 is housed in the space 89, the first electric motor MG1 can be oil-cooled and, therefore, the cooling performance of the first electric motor MG1 can be improved.

According to this example, the second electric motor MG2 coupled to the turbine impeller 16t of the torque converter 16 is further included, and the second electric motor MG2 is disposed between the first electric motor MG1 and the automatic transmission 18 in the axial direction in the space 89. As a result, since the second electric motor MG2 is housed in the space 89 (in the oil chamber) housing the automatic transmission 18 as is the case with the first electric motor MG1, the second electric motor MG2 can also be oil-cooled and the cooling performance can be improved.

According to this example, the oil pump 21 is disposed between the first electric motor MG1 and the second electric motor MG2 in the axial direction in the space 89 and the drive gear 70 of the oil pump 21 is coupled to the pump impeller 16p of the torque converter 16 via the first shaft 52 disposed in parallel with the axis on the inner circumferential side of the first electric motor MG1. As a result, when the pump impeller 16p of the torque converter 16 rotates, the drive gear 70 is rotated and the oil pump 21 is operated. Since the oil pump 21 is disposed between the first electric motor MG1 and the second electric motor MG2, heat transfer between the first electric motor MG1 and the second electric motor MG2 is suppressed and thermal performance is improved.

According to this example, the second shaft 54 parallel to the axis is disposed on the inner circumferential side of the first shaft 52; the stator impeller 16s of the torque converter 16 is coupled via the one-way clutch F1 and the second shaft 54 to the pump cover 74 that is a non-rotating member of the oil pump 21; and the second shaft 54 and the pump cover 74 are connected. As a result, the oil passage 75 for supplying the operating oil to the torque converter 16 can be formed between the inner circumferential surface of the first shaft 52 and the outer circumferential surface of the second shaft 54. Since the oil passage 75 is made up of the members different from the constituent members of the first electric motor MG1, the heat transfer between the oil passage 75 and the first electric motor MG1 is suppressed.

According to this example, the terminal blocks 100a and 100b of the first electric motor MG1 and the second electric motor MG2 are disposed on the outer circumferential side of the oil pump 21. As a result, since a space is formed on the outer circumferential side of the oil pump 21, the terminal blocks 100a and 100b of the first electric motor MG1 and the second electric motor MG2 can be disposed in the space with shifted phases so as to effectively utilize the space.

According to this example, the first partition wall 40 is formed between the torque converter 16 and the first electric motor MG1 and the first oil seal 86 is disposed on an inner circumferential portion of the first partition wall 40 so that the space 89 acting as the oil chamber is sealed by the first oil seal 86. As a result, the intrusion of foreign material into the space 89 acting as the oil chamber is prevented. The first oil seal 86 can also be used as the seal between the torque converter 16 and the automatic transmission 18 and an increase in the number of parts can be suppressed. Since the space 87 (air chamber) and the space 89 (oil chamber) can be partitioned by the first partition wall 40, heat transfer between the torque converter 16 and the first electric motor MG1 is suppressed.

According to this example, the second shaft and the cover member are connected by press-fitting. As a result, the press-fitting portion between the second shaft and the cover member also acts as a seal structure and eliminates the need for a seal member.

Although the example of the present invention has been described in detail with reference to the drawings, the present invention is also applied in other forms.

For example, although the automatic transmission 18 is a stepped transmission in the example, this is not a limitation of the present invention and, the automatic transmission may be, for example, a belt type continuously variable transmission and the type thereof may be changed as needed as long as consistency is achieved.

Although a gear type gear pump is used as the oil pump 21 in the example, this is not a limitation of the present invention and the oil pump may be, for example, a vane type oil pump and may be changed as needed as long as consistency is achieved.

Although the smaller diameter portions 54a and 60a are respectively formed on the second shaft 54 and the third shaft 60 in the example, these are not necessarily needed and the third shaft 60 may be prevented from falling by a jig etc.

Although the torque converter 16 is disposed in the example, any hydraulic power transmission device transmitting power through fluid is sufficient for the present invention and, for example, a fluid coupling may be used instead of the torque converter 16.

Although the engine 12 is disposed in the example, any prime mover generating power is sufficient for the present invention, and an electric motor etc. may be disposed instead of the engine 12.

The above description is merely an embodiment and the present invention can be implemented in variously modified and improved forms based on the knowledge of those skilled in the art.

NOMENCLATURE OF ELEMENTS

10: vehicle drive device 12: engine (prime mover) 16: torque converter (hydraulic power transmission device) 16p: pump impeller (input-side rotating member) 16t: turbine impeller (output-side rotating member) 16s: stator impeller 18: automatic transmission (transmission) 21: oil pump (oil pressure generating device) 26: drive wheels 38: transmission case (case member) 40: first partition wall (partition wall) 52: first shaft 54: second shaft 70: drive gear (drive gear) 74: pump cover (cover member) 86: first oil seal (seal member) 87: space (air chamber) 89 (89a-89d): space (oil chamber) 100a, 100b: terminal block MG1: first electric motor (electric motor) MG2: second electric motor (second electric motor) F1: one-way clutch

The invention claimed is:

1. A vehicle drive device comprising: a torque converter having an input-side rotating member to which power from a prime mover is input and an output-side rotating member outputting power to drive wheels; an electric motor coupled to the input-side rotating member; a transmission coupled to the output-side rotating member of the torque converter; and a case member housing the torque converter, the electric motor, and the transmission, the case member having an air chamber and an oil chamber, the prime mover and the electric motor being disposed at positions with the torque converter interposed therebetween in an axial direction, the torque converter being housed in the air chamber, the electric motor being housed in the oil chamber, the vehicle drive device further comprising a second electric motor coupled to the output-side rotating member of the torque converter, the second electric motor being disposed between the electric motor and the transmission in the axial direction in the oil chamber, an oil pressure generating device being disposed between the electric motor and the second electric motor in the axial direction in the oil chamber, and a drive gear of the oil pressure generating device being coupled to the input-side rotating member of the torque converter via a first shaft disposed in parallel with an axis on an inner circumferential side of the electric motor, a second shaft parallel to the axis being disposed on an inner circumferential side of the first shaft, a stator impeller of the torque converter being coupled via a one-way clutch and the second shaft to a cover member that is a non-rotating member of the oil pressure generating device, and the second shaft and the cover member being coupled, and an oil passage for supplying an operating oil to the torque converter being made up of a gap formed between an inner circumferential surface of the first shaft and an outer circumferential surface of the second shaft.

2. The vehicle drive device of claim 1, wherein
terminal blocks of the electric motor and the second electric motor are disposed on an outer circumferential side of the oil pressure generating device.

3. The vehicle drive device of claim 1, wherein
a partition wall is formed between the torque converter and the electric motor with a seal member disposed on an inner circumferential portion of the partition wall, and wherein
the seal member seals the oil chamber.

* * * * *